United States Patent [19]

Byrne et al.

[11] Patent Number: 6,051,793
[45] Date of Patent: *Apr. 18, 2000

[54] MULTIPLE PARALLEL CONDUCTOR FEATURING CONDUCTORS PARTIALLY WRAPPED WITH AN ARAMID OR OTHER SUITABLE WRAPPING MATERIAL

[75] Inventors: Michael J. Byrne, Simcoe; Charles G. Clarkson, St. Catharines, both of Canada

[73] Assignees: Alcatel, Paris, France; VA TECH Ferranti-Packard Transformers Limited, Ontario, Canada

[*] Notice: This patent issued on a continued prosecution application filed under 37 CFR 1.53(d), and is subject to the twenty year patent term provisions of 35 U.S.C. 154(a)(2).

[21] Appl. No.: 09/083,710

[22] Filed: May 22, 1998

[51] Int. Cl.$^7$ ...................................................... H01B 7/02
[52] U.S. Cl. .................................. 174/120 R; 174/120 R; 174/121 R
[58] Field of Search ........................... 174/113 R, 120 R, 174/121 R, 102 SP, 107, 108, 109, 15.1, 15.7; 310/52, 53, 54, 200, 201, 208

[56] References Cited

U.S. PATENT DOCUMENTS

| | | | |
|---|---|---|---|
| 2,805,472 | 9/1957 | Botts et al. | 174/113 R X |
| 4,329,538 | 5/1982 | Meyer | 174/120 R X |
| 4,731,134 | 3/1988 | Alloin et al. | 174/15.7 X |
| 5,066,881 | 11/1991 | Elton et al. | 310/213 |
| 5,545,059 | 8/1996 | Nelson | 439/583 |

FOREIGN PATENT DOCUMENTS 9530991  11/1995  WIPO.

OTHER PUBLICATIONS

Hawley, "Condensed Chemical Dictionary" p. 593, 1981.
Hawley, "Condensed Chemical Dictionary", pp. 85–86, 740, 1981.
Abstract of U.S. Patent No. 5,097,241 by Smith et al., "Cooling Apparatus For Windings", issued Mar. 17, 1992.
Abstract of U.S. Patent No. 5,365,211 by Carbaugh, Jr. et al., "Wound Coil With Integral Cooling Passages", issued Nov. 15, 1994.
Abstract of U.S. Patent No. 5,461,215 by Haldeman, "Fluid Cooled Litz Coil Inductive Heater and Connector Therefor", issued Oct. 24, 1998.

*Primary Examiner*—Kristine Kincaid
*Assistant Examiner*—Chau N. Nguyen
*Attorney, Agent, or Firm*—Ware, Fressola, Van Der Sluys & Adolphson LLP

[57] ABSTRACT

The invention provides a multiple parallel conductor for windings of electrical motors, including transformers, having individual insulated partial conductors with at least five partial conductors or transposed conductors. The multiple parallel conductor features a material that is partially wrapped about the individual insulated partial conductors for allowing cooling fluid to pass through the individual insulated partial conductors. The material is partially wrapped about the individual insulated partial conductors in a helical configuration. In one embodiment, the material is an aramid material such as Nomex™.

5 Claims, 2 Drawing Sheets

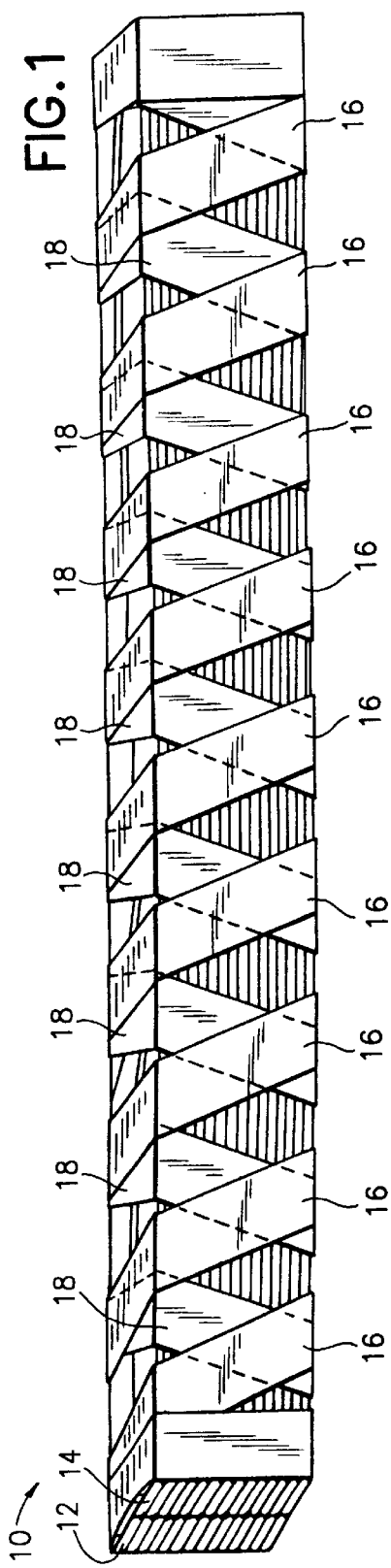
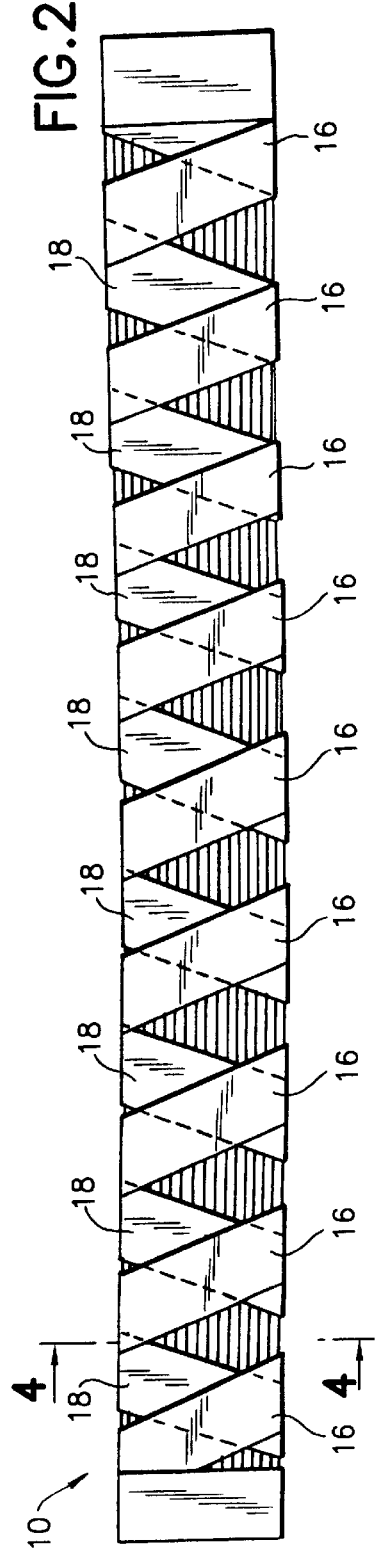

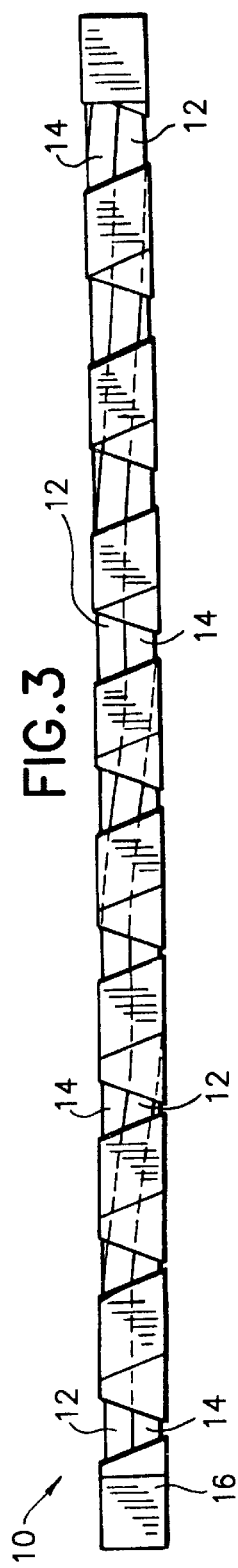
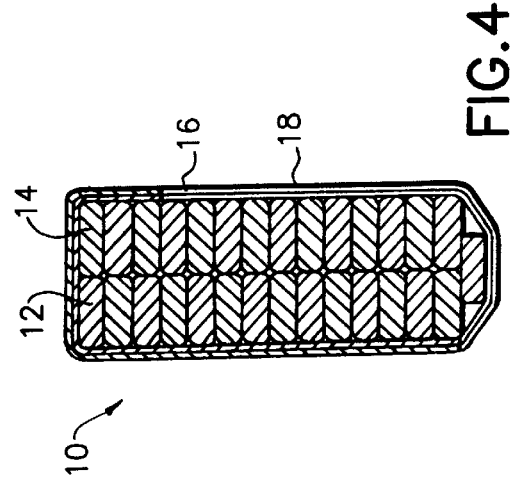

MULTIPLE PARALLEL CONDUCTOR FEATURING CONDUCTORS PARTIALLY WRAPPED WITH AN ARAMID OR OTHER SUITABLE WRAPPING MATERIAL

BACKGROUND OF THE INVENTION

1. Field Of The Invention

The present invention relates generally to a multiple parallel conductor for windings of electrical machines; and more particularly to continuously transposed cable ("CTC") conductors having individual insulated partial conductors with at least five partial conductors or transposed conductors.

2. Discussion of Related Art

In the prior art, multiple parallel conductors are known for windings of electrical machines. A typical electrical transformer coil comprised of continuously transposed cable ("CTC") conductors having individual insulated partial conductors with at least five partial conductors or transposed conductors is held together in a bundle by completely wrapping the conductors with multiple layers of material such as paper, Nomex™, or other suitable wrapping medium.

However, one disadvantage of such designs is that the completely wrapped conductors trap layers of stagnant cooling fluid which reduces the heat transfer rate, resulting in decreased conductor cooling efficiency. The completely wrapped conductors have an additional disadvantage in that they absorb cooling fluid such that the cross-sectional area is increased, reducing the cooling channel cross-section and thereby reducing cooling efficiency.

International Application No. WO 95/30991 teaches the use of polyester and/or fiberglass mesh to hold conductors in place, and also permits cooling fluid to pass from one side of the mesh to another, thereby cooling the conductors more efficiently.

SUMMARY OF THE INVENTION

The present invention features partially wrapping the conductors of a multiple parallel conductor with a material such as Nomex™ 410, or other material with a suitable tear and longitudinal strength and transformer oil compatibility.

In one embodiment, the conductors of a transformer are partially wrapped, using a suitable wrapping medium, so that the conductors are only partially covered. In a preferred embodiment, the wrapping medium would cover a portion of the coil, depending on the desired amount of cooling.

There are several advantages to the design of the present invention. By partially wrapping the conductors, cooling fluid will not be trapped within the wrapping medium. In addition, by partially wrapping the conductors, the amount of material is reduced when compared to a transformer utilizing multiple layers. Other advantages may also include: enhanced conductor size and electrical machine cooling; reduced coil size; possible reduced machine size and reduced cooling duct obstructions.

Other objects and advantages of the present invention will become apparent to those skilled in the art from the following detailed description read in conjunction with the attached drawings and claims appended hereto.

BRIEF DESCRIPTION OF THE DRAWING

For a fuller understanding of the nature and objects of the invention, reference should be made to the following detailed description taken in conjunction with the accompanying drawing, not drawn to scale, in which:

FIG. 1 is a perspective view of a multiple parallel conductor that is the subject matter of the present invention;

FIG. 2 is a side view of the multiple parallel conductor shown in FIG. 1;

FIG. 3 is a top view of the multiple parallel conductor shown in FIG. 1; and FIG. 4 is a diagram of a cross-sectional view of the multiple parallel conductor shown in FIG. 2 along lines 4—4.

DESCRIPTION OF THE BEST MODE OF THE INVENTION

FIGS. 1–4 show a multiple parallel conductor generally indicated as 10 for windings of electrical motors, including transformers, having a bundle of individual insulated partial conductors with at least five partial conductors or transposed conductors indicated as 12, 14. As best shown in FIGS. 1 and 4, the multiple parallel conductor may include 14 partial conductors or transposed conductors like 12, 14 that crossover one another, similar to that shown in International Application no. WO 95/30991, discussed above. In one embodiment, the individual insulated partial conductors with at least five partial conductors or transposed conductors 12, 14 may be insulated with lacquer. However, the scope of the invention is not intended to be limited to any particular size, shape, number, type of insulation material or other relationship of the conductors.

As shown, the multiple parallel conductor 10 has a material generally indicated as 16, 18 that is partially wrapped about an entire length of the bundle of the individual insulated partial conductors for allowing cooling fluid to pass through the individual insulated partial conductors. As discussed above, by partially wrapping the conductors, the amount of material (such as Nomex™) used is reduced when compared to a transformer utilizing a complete wrap of the material.

The material 16, 18 used may be an aramid material, or other suitable wrapping material. The scope of the invention is clearly intended to cover other types of aramid materials, and may also include any of a group of lightweight but very strong heat-resistant synthetic aromatic polyamide materials that are fashioned into fibers, filaments, or sheets and used especially in textiles and plastics.

The material 16, 18 is partially wrapped about the individual insulated partial conductors in a helical configuration, as best shown in FIGS. 1–3. As shown in FIGS. 1–2, the aramid material 16 is partially wrapped and wound about the outer surface of individual insulated partial conductors 12, 14 in the helical configuration, while the aramid material 18 is partially wrapped and wound about the outer surface of individual insulated partial conductors in a contrahelical configuration. As shown, the material 16, 18 partially covers about 50% of the individual insulated partial conductors although the scope of the invention is not intended to be limited to that particular percentage. For example, embodiments are envisioned in which 30% or 70% of the individual insulated partial conductors are partially covered by the material 16, 18.

Although the present invention has been described with respect to one or more particular embodiments of the apparatus, it will be understood that other embodiments of the present invention may be made without departing from the spirit and scope of the present invention. Hence, the present invention is deemed limited only by the appended claims and the reasonable interpretation thereof.

What is claimed is:

1. A multiple parallel conductor for use as a winding of an electrical motor, including a transformer, comprising:

a bundle of individual insulated partial conductors having at least five partial conductors or transposed conductors for conducting electrical energy, the bundle of individual insulated partial conductors having an outer surface; and an aramid material being partially wrapped about an entire length of the bundle of individual insulated partial conductors and partially covering 30% to 70% of the outer surface of the bundle of individual insulated partial conductors forming a partially wrapped bundle of individual insulated partial conductors, the aramid material being responsive to cooling fluid during the conduction of the electrical energy by the individual insulated partial conductors, and allowing the cooling fluid to pass through the individual insulated partial conductors to remove the heat from the individual insulated partial conductors.

2. A multiple parallel conductor according to claim 1, wherein the aramid material is partially wrapped and wound about the outer surface of the bundle of individual insulated partial conductors in a helical configuration.

3. A multiple parallel conductor according to claim 1, wherein the aramid material is partially wrapped and wound about the outer surface of individual insulated partial conductors in a combined helical and contrahelical configuration.

4. A multiple parallel conductor according to claim 1, wherein the aramid material partially covers 50% of the outer surface of the bundle of individual insulated partial conductors.

5. A multiple parallel conductor according to claim 1, wherein the aramid material includes any of a group of lightweight but very strong heat-resistant synthetic aromatic polyamide materials that can be fashioned into fibers, filaments, or sheets and used especially in textiles and plastics.

* * * * *